(12) United States Patent
Nishikawa et al.

(10) Patent No.: US 9,403,461 B2
(45) Date of Patent: Aug. 2, 2016

(54) SEAT HEATER DEVICE

(75) Inventors: Masanori Nishikawa, Shiga (JP);
Masahiro Takiguchi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 248 days.

(21) Appl. No.: 14/124,518

(22) PCT Filed: Jun. 8, 2011

(86) PCT No.: PCT/JP2011/003218
§ 371 (c)(1),
(2), (4) Date: Dec. 6, 2013

(87) PCT Pub. No.: WO2012/168968
PCT Pub. Date: Dec. 13, 2012

(65) Prior Publication Data
US 2014/0103021 A1    Apr. 17, 2014

(51) Int. Cl.
*H05B 1/02* (2006.01)
*H05B 3/02* (2006.01)
(Continued)

(52) U.S. Cl.
CPC ............ *B60N 2/5678* (2013.01); *B60N 2/5685* (2013.01); *G05D 23/19* (2013.01); *H05B 1/0202* (2013.01); *H05B 1/0238* (2013.01); *H05B 2203/029* (2013.01)

(58) Field of Classification Search
CPC ............... H05B 1/0202; H05B 1/0238; H05B 2203/029; B60N 2/5685; B60N 2/5678
See application file for complete search history.

(56) References Cited

U.S. PATENT DOCUMENTS

| 5,075,537 A | * | 12/1991 | Lorenzen | ............... | A47C 7/748 |
| | | | | | 219/202 |
| 5,229,579 A | * | 7/1993 | Ingraham | ............... | A47C 7/748 |
| | | | | | 219/202 |
| 5,288,974 A | | 2/1994 | Hanzic | | |

FOREIGN PATENT DOCUMENTS

| CN | 201261413 | 6/2009 |
| EP | 1087491 | 3/2001 |

(Continued)

OTHER PUBLICATIONS

Chinese Office Action, Jun. 26, 2015; Chinese Patent Application No. 201180071463.1, with English translation of its Search Report (9 pages).

(Continued)

*Primary Examiner* — Joseph M Pelham
(74) *Attorney, Agent, or Firm* — Hamre, Schumann, Mueller & Larson, P.C.

(57) ABSTRACT

A seat heater device initiates power supply upon operation of a switch by a seat occupant within a vehicle interior and includes a heater for warming installed in a seat within the vehicle interior and a control unit for controlling energization of the heater for warming. The control unit includes a low-voltage detecting means for detecting whether an input voltage is a regular drive voltage value of the control unit or a voltage value lower than a predetermined voltage value and a switching element that is turned on when the low-voltage detecting means detects the regular drive voltage value of the control unit and turned off when the low-voltage detecting means detects a voltage value lower than the predetermined voltage value. This configuration can avoid heat generation of the switching element even if a leakage occurs in an electronic circuit within the switch due to, for example, insulation failure.

2 Claims, 4 Drawing Sheets

(51) Int. Cl.
  *B60N 2/44* (2006.01)
  *B60H 1/22* (2006.01)
  *G05D 23/00* (2006.01)
  *B60N 2/56* (2006.01)
  *G05D 23/19* (2006.01)

(56) References Cited

FOREIGN PATENT DOCUMENTS

| GB | 2427039 | 12/2006 |
| JP | S58-101811 | 6/1983 |
| JP | 4-314641 | 11/1992 |
| JP | 7-017363 | 1/1995 |
| JP | 7-045355 | 2/1995 |
| JP | 2005-132138 A | 5/2005 |
| JP | 2005-255078 A | 9/2005 |
| JP | 2011-018494 | 1/2011 |
| WO | WO 90/10999 | 9/1990 |
| WO | WO 2007/102502 | 9/2007 |

OTHER PUBLICATIONS

Office Action issued in counterpart Japanese Patent Application No. 2013-519226 on Jan. 5, 2016 (3 pages).

\* cited by examiner

SEAT HEATER DEVICE

TECHNICAL FIELD

The claimed invention relates to a seat heater device for warming a seat occupant (for example, a vehicle driver or a fellow passenger).

BACKGROUND ART

Various seat heater devices have been hitherto researched and developed. As an example of the conventional seat heater devices, a seat heater device as disclosed in Patent Document 1 is explained.

The seat heater device includes a base material having a cord-like heater disposed thereon and a temperature control circuit disposed on the base material and is installed in a seat within a vehicle interior. The temperature control circuit is connected to one end of a lead wire, the other end of which is connected to a power source, a manually-operated switch and the like provided on a center console or a dashboard of a vehicle. When a seat occupant operates the switch, power supply from the power source is initiated to heat the cord-like heater, thereby warming the seat occupant.

Patent Document(s)

Patent Document 1: WO 07/102502

SUMMARY OF THE INVENTION

Problems to be Solved by the Invention

In addition to the switch, a cup holder for holding, for example, a beverage cup or a tray is disposed on the center console or the dashboard within the vehicle interior. However, a beverage may spill over the cup for some reason and enter the switch, thereby posing a problem that a leakage may occur in an electronic circuit within the switch due to, for example, insulation failure. If such a leakage occurs on the side of the switch, a drive voltage applied to the heater for warming the seat occupant does not change and only a voltage of a circuit-driving power source of a control unit reduces. As a result, a signal supply voltage of a switching element (not shown) reduces to thereby increase an internal resistance of the switching element and, hence, there is a possibility of abnormal heat generation.

It is accordingly an objective of the claimed invention to provide a seat heater device capable of avoiding heat generation of a switching element that may be caused by a liquid entering a manually-operated switch.

Means to Solve the Problems

In accomplishing the above objective, a seat heater device according to the claimed invention, operable to initiate power supply upon operation of a switch by a seat occupant within a vehicle interior, the seat heater device comprising: a heater for warming installed in a seat within the vehicle interior; and a control unit operable to control energization of the heater for warming, the control unit comprising: a low-voltage detecting means operable to detect whether an input voltage of the control unit is a regular drive voltage value of the control unit or a voltage value lower than a predetermined voltage value; and a switching element that is turned on when the low-voltage detecting means detects the regular drive voltage value of the control unit and turned off when the low-voltage detecting means detects a voltage value lower than the predetermined voltage value.

Effects of the Invention

According to the claimed invention, when the low-voltage detecting means detects the low voltage, the control unit deems that a liquid has entered the manual switch and turns the switching element off. Because the switching element is not turned on if the liquid has entered the manual switch, an internal resistance of the switching element does not increase, thus making it possible to avoid abnormal heat generation.

BRIEF DESCRIPTION OF THE DRAWINGS

The above aspect and features of the claimed invention will become apparent from the following description of preferred embodiments thereof with reference to the accompanying drawings, in which:

DESCRIPTION OF EMBODIMENTS

Figure 1:
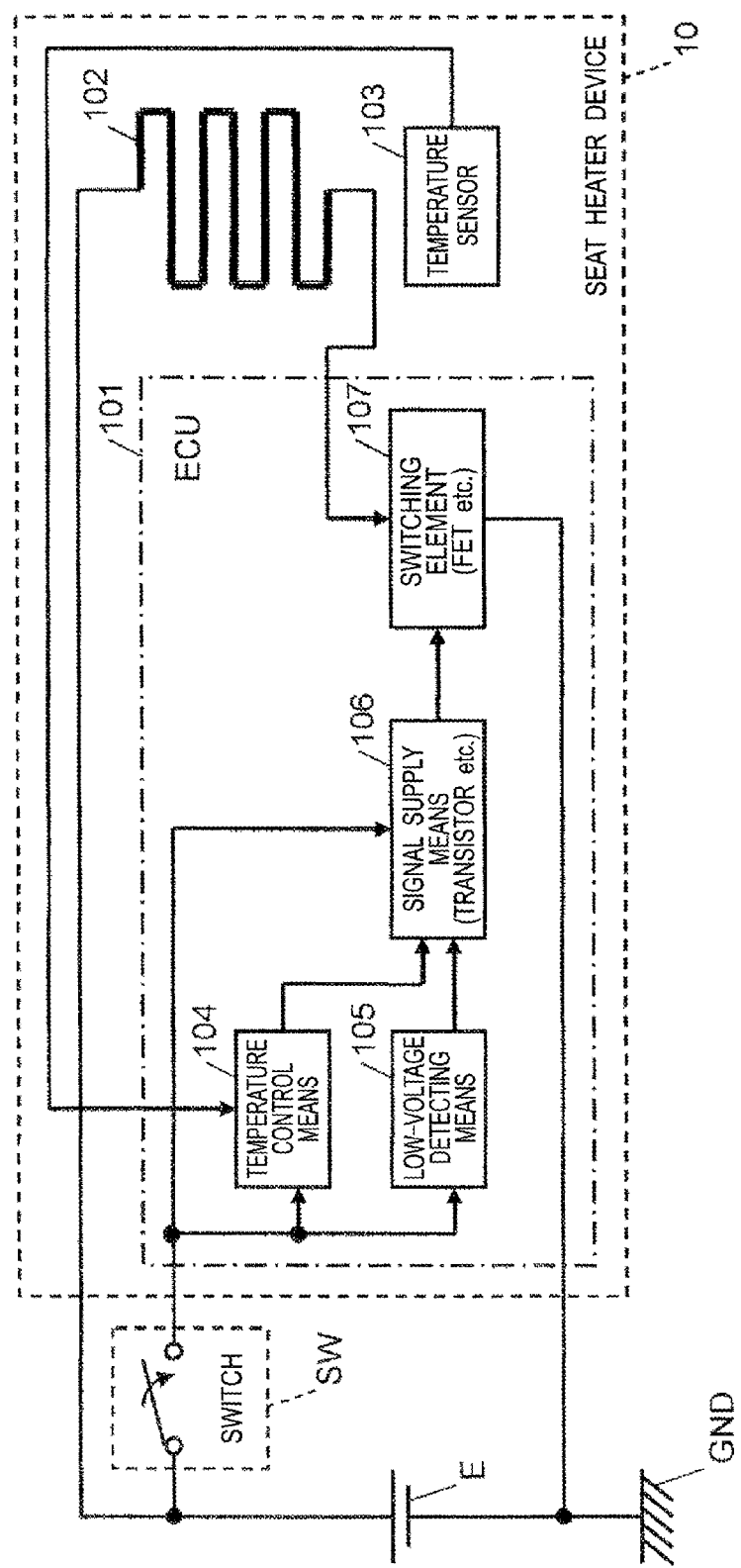
FIG. 1 is a view depicting a configuration of a seat heater device 10 according to an embodiment of the claimed invention.

Before starting the description of the claimed invention, like parts are designated by like reference numerals in the accompanying drawings. Embodiments of the claimed invention are described hereinafter in detail with reference to the drawings.

Embodiment 1

FIG. 1 is a view depicting a configuration of a seat heater device 10 according to an embodiment of the claimed invention. In FIG. 1, the seat heater device 10 is installed within a vehicle interior and connected to a battery E via a switch SW.

The seat heater device 10 is provided with an ECU (Electronic Control Unit) 101, a heater 102 for warming, and a temperature sensor 103.

The switch SW is provided on a center console, an instrument panel, a dashboard or the like of a vehicle and operated (manually operated) by a seat occupant within the vehicle interior. When the switch SW is turned on, electric power is supplied from the battery E to the ECU 101.

The ECU 101 is provided with a temperature control means 104, a low-voltage detecting means 105, a signal supply means 106 and a switching element 107 to mainly control energization of the heater 102 for warming.

The temperature control means 104 includes a comparator and the like to compare a detection result of the temperature sensor 103 described later with a reference temperature. If the detection result of the temperature sensor 103 is less than or equal to the reference temperature, the temperature control means 104 outputs a signal indicating this fact (hereinafter referred to as an energization instruction) to the signal supply means 106. In contrast, if the detection result of the temperature sensor 103 exceeds the reference temperature, the temperature control means 104 outputs a signal indicating this fact (hereinafter referred to as an energization stop instruction) to the signal supply means 106. The reference temperature is a temperature set by the seat occupant using, for example, an operating portion (a button or dial).

The signal supply means 106 is, for example, a transistor that acts to supply a circuit drive voltage of the ECU 101 to the switching element 107 when a signal is inputted to a gate.

The switching element 107 switches energization of the heater 102 for warming based on a drive signal voltage from the signal supply means 106.

That is, if the energization instruction is given from the temperature control means 104, the signal supply means 106 turns the switching element 107 on to increase the temperature of the heater 102 for warming up to the reference temperature. In contrast, in response to the energization stop instruction from the temperature control means 104, the signal supply means 106 turns the switching element 107 off to reduce the temperature of the heater 102 for warming.

The low-voltage detecting means 105 detects the drive voltage of the ECU 101 immediately after the switch SW to determine as to whether or not the detected drive voltage is a low voltage by comparing the detected drive voltage with a predetermined voltage value using a comparator or the like.

Figure 2A:
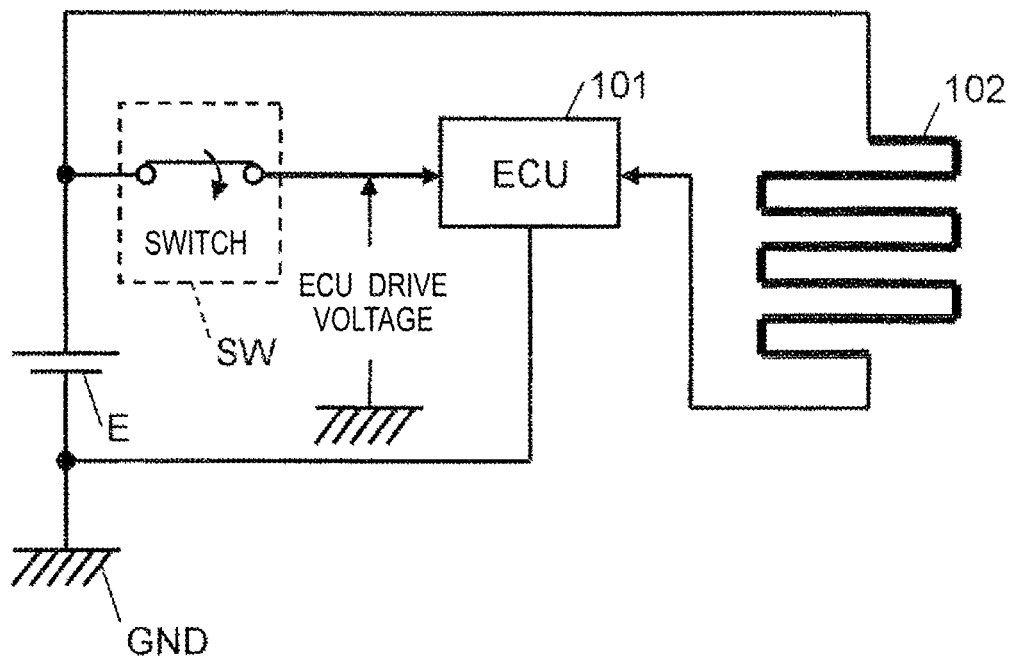
FIG. 2A is a view depicting a detection value of a low-voltage detecting means 105 when a switch SW shown in FIG. 1 has been operated.

As shown in FIG. 2A, if the seat occupant operates the switch SW, the low-voltage detecting means 105 detects the drive voltage (known drive voltage) of the ECU 101 as an input voltage of the ECU 101 because the resistance value of the switch SW is substantially zero. In such a case, because no problem arises even if the heater 102 for warming is supplied with electricity, the low-voltage detecting means 105 outputs an electric signal required for instructing energization (energization instruction) to the signal supply means 106. FIG. 2A depicts only essential portions.

Figure 2B:
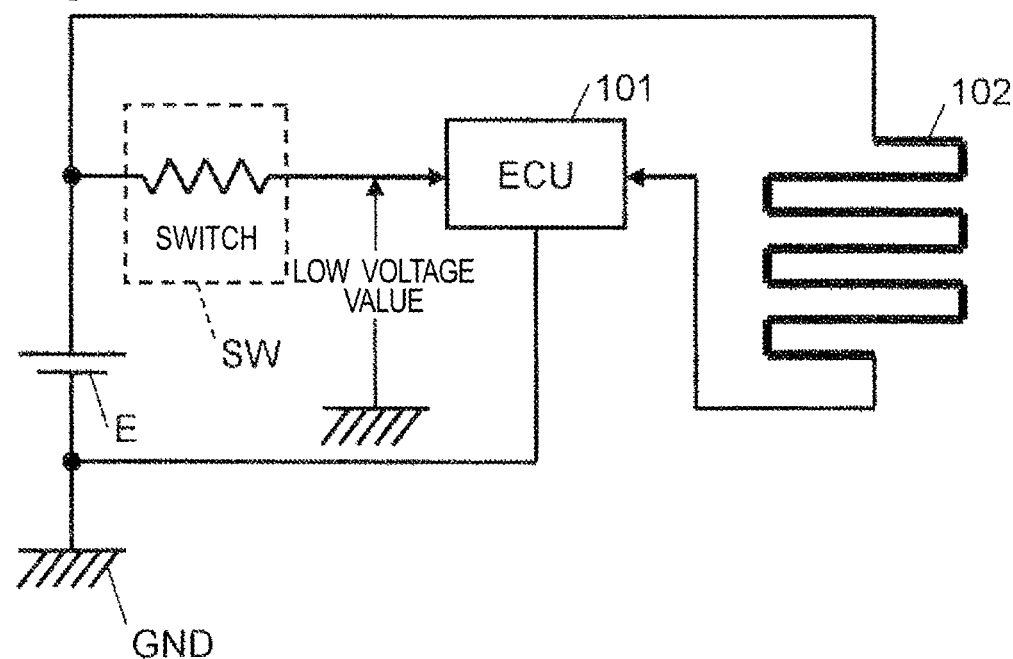
FIG. 2B is a view depicting a detection value of the low-voltage detecting means 105 when a beverage has entered the switch SW of FIG. 1.

Although explained in the column "Problems to be solved by the Invention", a cup holder for holding, for example, a beverage cup or a tray is disposed on the center console or the dashboard within the vehicle interior. However, a beverage may spill over the cup for some reason and a liquid or the like may enter the switch SW. In this case, a leakage due to insulation failure occurs within the switch SW and, hence, a resistance component appears as shown in FIG. 2B. In such a case, the low-voltage detecting means 105 detects a value (hereinafter referred to as a low voltage value) obtained by subtracting a voltage drop caused by the resistance component of the switch SW from the drive voltage of the ECU 101. As such, the voltage of a drive power source of the ECU 101 reduces, thus resulting in a reduction in voltage of the drive signal of the switching element 107 outputted from the signal supply means 106.

Figure 3:
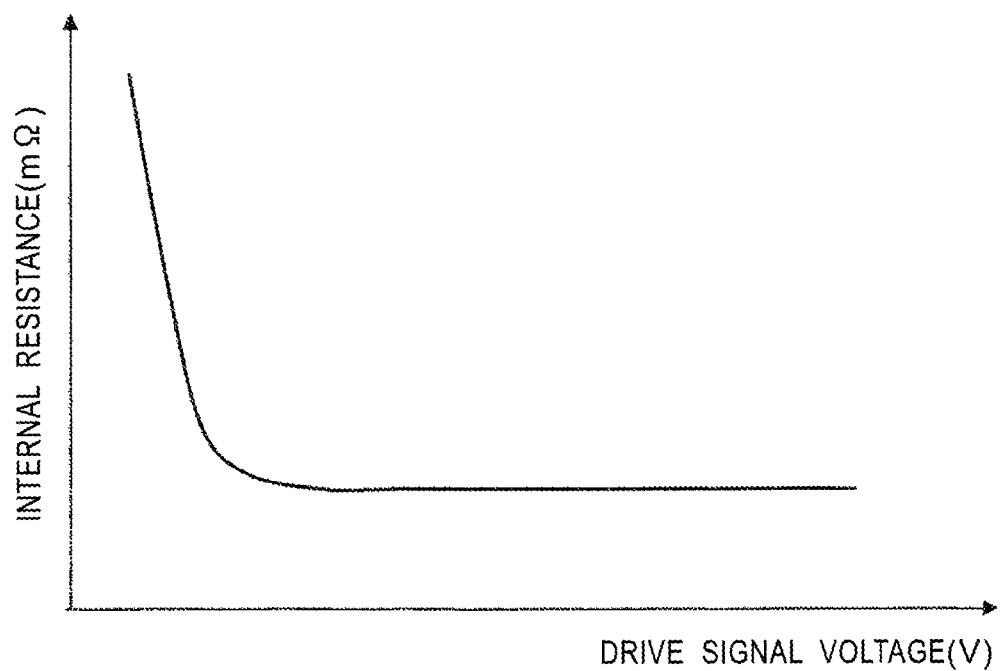
FIG. 3 is a view depicting a relationship between a drive signal voltage and an internal resistance of a switching element 107.

In this event, a relationship between the drive signal voltage and an internal resistance of the switching element 107 is shown in FIG. 3. The switching element 107 has a feature of increasing the internal resistance with a reduction in the drive signal voltage.

Accordingly, the reduction in the drive signal voltage of the switching element 107 increases the internal resistance, thus posing a problem that heat generated by the switching element 107 may increase. In order to solve this problem, the low-voltage detecting means 105 is so designed as to output, if a predetermined low voltage value has been detected, an electric signal indicating that energization is not allowed (hereinafter referred to as energization disable) to the signal supply means 106 so as not to supply the drive signal voltage of the switching element 107. FIG. 2B also depicts only the essential portions.

When an energization instruction is inputted from the low-voltage detecting means 105, the signal supply means 106 turns the switching element 107 on, thus making it possible to initiate power supply to the heater 102 for warming and accordingly warm the seat occupant. On the other hand, when an energization disable instruction is inputted from the low-voltage detecting means 105, the signal supply means 106 does not turn the switching element 107 on, thus making it possible to eliminate the risk of increasing the amount of heat generation of the ECU 101.

Figure 4:
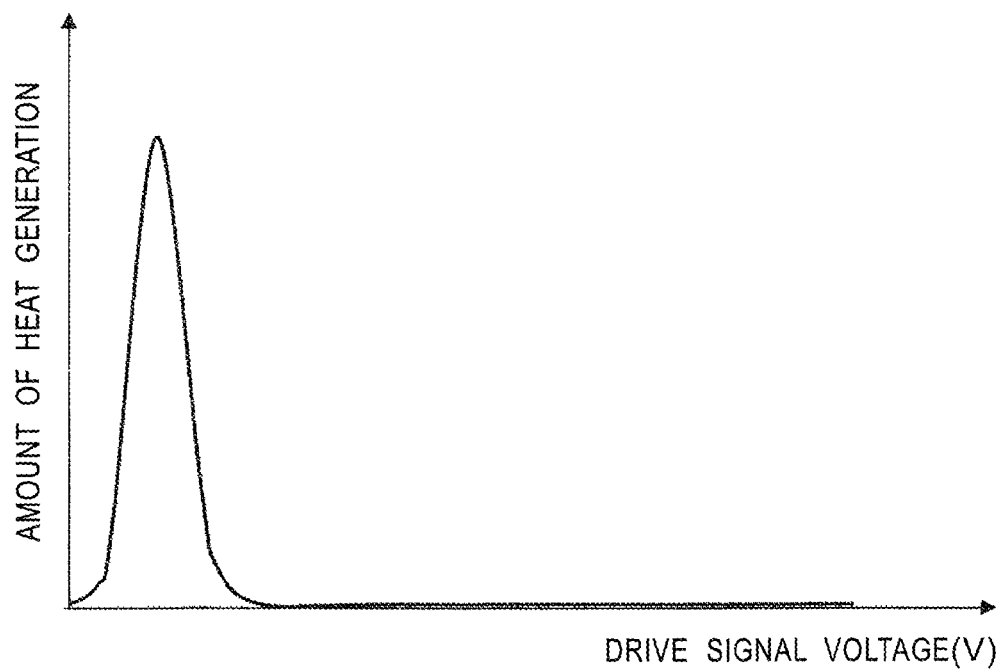
FIG. 4 is a view depicting a relationship between the drive signal voltage of the switching element 107 and an amount of heat generation.

Here, if the internal resistance of the switching element 107 increases too much, an electric current flowing therethrough reduces, followed by a reduction in the amount of heat generation. In contrast, if the internal resistance is small, the amount of heat generation tends to reduce, but when the internal resistance becomes to have a halfway value (for example, a value close to the resistance value of the heater for warming), there exists a point where the amount of heat generation is maximized. This point where the amount of heat generation is maximized and, further, the drive signal voltage of the switching element 107 can be calculated through various experiments. The aforementioned predetermined voltage is determined as a drive signal voltage value capable of avoiding a state where the switching element 107 generates heat (see FIG. 4). In addition, this voltage value must be set to be lower than a lower limit of the drive voltage that allows original function of the product.

As explained hereinabove, in the seat heater device according to the first embodiment, if the low-voltage detecting means 105 detects a voltage lower than the predetermined voltage, it is determined that a liquid has entered the manually-operated switch SW. If this low voltage has been detected, the switching element 107 is turned off in response to an energization disable instruction from the signal supply means 106. As just described, because the switching element 107 is not turned on if a liquid has entered the manually-operated switch SW, the internal resistance of the switching element 107 does not increase, thus making it possible to avoid abnormal heat generation.

Also, the comparator of the low-voltage detecting means 105 detects the drive voltage of the ECU 101 immediately after the switch SW to compare the detected drive voltage with the predetermined voltage value. In this event, the use of a zener diode to produce the predetermined voltage for comparison ensures comparison with that voltage and subsequent determination, thereby making it possible to enhance the accuracy in detecting the low voltage.

Any combination of the various embodiments referred to above can produce respective effects.

Although the claimed invention has been fully described by way of preferred embodiments with reference to the accompanying drawings, it is to be noted here that various changes and modifications will be apparent to those skilled in the art. Therefore, unless such changes and modifications otherwise depart from the scope of the claimed invention as set forth in the appended claims, they should be construed as being included therein.

INDUSTRIAL APPLICABILITY

The seat heater device according to the claimed invention can assure higher safety than ever before and is suited for use in a vehicle.

The invention claimed is:

1. A seat heater device operable to initiate power supply upon operation of a switch by a seat occupant within a vehicle interior, the seat heater device comprising:

a heater for warming installed in a seat within the vehicle interior; and a control unit operable to control energization of the heater for warming, the control unit comprising:

a low-voltage detecting means operable to detect whether a drive voltage of the control unit is a regular drive voltage value of the control unit or a voltage value lower than a predetermined voltage value; and a switching element that is turned on when the low-voltage detecting means detects the regular drive voltage value of the control unit, wherein the control unit turns off the switching element when the low-voltage detecting means detects a voltage value lower than the predetermined voltage value due to a reduction in the drive voltage of the control unit even when a drive voltage applied to the heater for warming is not reduced.

2. The seat heater device according to claim 1, wherein the low-voltage detecting means produces the predetermined voltage value for comparison with use of a zener diode.

\* \* \* \* \*